US012019735B2

(12) United States Patent
Baker et al.

(10) Patent No.: US 12,019,735 B2
(45) Date of Patent: Jun. 25, 2024

(54) TRACING FUNCTION EXECUTION IN A DATABASE SYSTEM

(71) Applicant: Snowflake Inc., Bozeman, MT (US)

(72) Inventors: Brandon S. Baker, Redmond, WA (US); Derek Denny-Brown, Seattle, WA (US); Mark M. Manning, Penfield, NY (US); Andong Zhan, San Mateo, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/355,563

(22) Filed: Jul. 20, 2023

(65) Prior Publication Data
US 2023/0359727 A1 Nov. 9, 2023

Related U.S. Application Data

(63) Continuation of application No. 18/161,514, filed on Jan. 30, 2023, now Pat. No. 11,822,645, which is a continuation of application No. 17/809,622, filed on Jun. 29, 2022, now Pat. No. 11,640,458, which is a continuation of application No. 17/390,251, filed on Jul. 30, 2021, now Pat. No. 11,409,864.

(Continued)

(51) Int. Cl.
G06F 21/53 (2013.01)
G06F 16/245 (2019.01)

(52) U.S. Cl.
CPC ............ G06F 21/53 (2013.01); G06F 16/245 (2019.01); G06F 2221/033 (2013.01)

(58) Field of Classification Search
CPC .. G06F 21/53; G06F 16/245; G06F 2221/033; G06F 21/629
See application file for complete search history.

(56) References Cited

U.S. PATENT DOCUMENTS 6,823,460 B1 11/2004 Hollander et al.
11,409,864 B1 8/2022 Baker et al.
(Continued)

OTHER PUBLICATIONS

Kishore et al., "NITRSCT : A Software Security tool for collection and analysis of Kernel Calls", Oct. 2019, IEEE Region 10 Conference, pp. 510-515 (Year: 2019).*

(Continued)

Primary Examiner — Kenneth W Chang
(74) Attorney, Agent, or Firm — Schwegman Lundberg & Woessner, P.A.

(57) ABSTRACT

A method for tracing function execution includes instantiating, by at least one hardware processor of a computing node, a user-defined function (UDF) server associated with a plurality of configurations. A plurality of child processes of the UDF server are instantiated using the plurality of configurations. A filtering process is configured at an operating system (OS) kernel of the computing node using a child process of the plurality of child processes. The filtering process includes a set of system call categories and a corresponding set of filtering policies. A system call received at the OS kernel and associated with a system call category of the set of system call categories is detected to violate a corresponding filtering policy of the set of filtering policies. A tracing event of the system call is initiated based on the detecting.

30 Claims, 8 Drawing Sheets

Related U.S. Application Data

(60) Provisional application No. 63/197,813, filed on Jun. 7, 2021.

(56) References Cited

U.S. PATENT DOCUMENTS

| | | | |
|---|---|---|---|
| 11,640,458 B2 | 5/2023 | Baker et al. | |
| 2003/0135758 A1 | 7/2003 | Turner | |
| 2004/0064449 A1* | 4/2004 | Ripley | G06F 16/2455 707/999.005 |
| 2005/0228990 A1 | 10/2005 | Kato et al. | |
| 2006/0150256 A1 | 7/2006 | Fanton et al. | |
| 2006/0167850 A1 | 7/2006 | Fish et al. | |
| 2007/0157288 A1 | 7/2007 | Lim | |
| 2008/0127292 A1 | 5/2008 | Cooper et al. | |
| 2008/0178256 A1 | 7/2008 | Perrone et al. | |
| 2008/0250400 A1 | 10/2008 | Vertes | |
| 2009/0125480 A1* | 5/2009 | Zhang | G06F 16/8358 |
| 2010/0223287 A1 | 9/2010 | Lim | |
| 2010/0325077 A1 | 12/2010 | Higuchi | |
| 2011/0029551 A1 | 2/2011 | Chen et al. | |
| 2011/0065419 A1 | 3/2011 | Book et al. | |
| 2012/0265866 A1 | 10/2012 | Stanciu et al. | |
| 2014/0137184 A1 | 5/2014 | Russello et al. | |
| 2014/0173700 A1 | 6/2014 | Awan et al. | |
| 2015/0169865 A1 | 6/2015 | Janakiram | |
| 2015/0332043 A1 | 11/2015 | Russello | |
| 2016/0132365 A1 | 5/2016 | Pan et al. | |
| 2020/0186445 A1* | 6/2020 | Govindaraju | H04L 67/34 |
| 2021/0303371 A1 | 9/2021 | Wang et al. | |
| 2022/0391492 A1 | 12/2022 | Baker et al. | |
| 2023/0177145 A1 | 6/2023 | Baker et al. | |

OTHER PUBLICATIONS

Yamauchi et al., "Additional Kernel Observer to Prevent Privilege Escalation Attacks by Focusing on System Call Privilege Changes", Dec. 2018, IEEE Conference on Dependable and Secure Computing, 2018, pp. 1-8 (Year: 2018).*

"U.S. Appl. No. 17/390,251, Non Final Office Action dated Nov. 19, 2021", 24 pgs.

"U.S. Appl. No. 17/390,251, Response filed Feb. 8, 2022 to Non Final Office Action dated Nov. 19, 2021", 15 pgs.

"U.S. Appl. No. 17/390,251, Examiner Interview Summary dated Feb. 9, 2022", 2 pgs.

"U.S. Appl. No. 17/390,251, Notice of Allowance dated May 4, 2022", 12 pgs.

"U.S. Appl. No. 17/809,622, Non Final Office Action dated Aug. 30, 2022", 31 pgs.

"U.S. Appl. No. 17/809,622, Response filed Nov. 21, 2022 to Non Final Office Action dated Aug. 30, 2022", 13 pgs.

"U.S. Appl. No. 17/809,622, Notice of Allowance dated Dec. 20, 2022", 14 pgs.

"U.S. Appl. No. 17/809,622, Examiner Interview Summary dated Apr. 20, 2023", 2 pgs.

"U.S. Appl. No. 18/161,514, Non Final Office Action dated Apr. 24, 2023", 38 pgs.

"U.S. Appl. No. 18/161,514, Response filed May 31, 2023 to Non Final Office Action dated Apr. 24, 2023", 14 pgs.

"U.S. Appl. No. 18/161,514, Notice of Allowance dated Jun. 15, 2023", 15 pgs.

Jaiswal, "Android Gaming Malware Detection Using System Call Analysis", Mar. 2018, 6th International Symposium on Digital Forensic and Security,, (Mar. 2018), 1-5.

Li, "Application Sandbox Model Based on System Call Context", International Conference on Communications and Mobile Computing, 102-106, (May 2010).

Win, "PROTECT: Container Process Isolation using System Call Interception", 14th International Symposium on Pervasive Systems, Algorithms and Networks, (2017), 191-196.

* cited by examiner

TRACING FUNCTION EXECUTION IN A DATABASE SYSTEM

CROSS-REFERENCE TO RELATED APPLICATIONS

This application is a Continuation of U.S. patent application Ser. No. 18/161,514, filed Jan. 30, 2023, which is a Continuation of U.S. patent application Ser. No. 17/809,622, filed Jun. 29, 2022 and now issued as U.S. Pat. No. 11,640,458, which is a Continuation of U.S. patent application Ser. No. 17/390,251, filed Jul. 30, 2021 and now issued as U.S. Pat. No. 11,409,864, which claims the benefit of priority to U.S. Patent Application Ser. No. 63/197,813, filed Jun. 7, 2021, the contents of which are incorporated herein by reference in their entireties.

TECHNICAL FIELD

Embodiments of the disclosure relate generally to a network-based database system or a cloud data platform and, more specifically, to a tracing supervisor (also referred to as tracing manager) for user-defined functions (UDFs).

BACKGROUND

Cloud-based data warehouses and other database systems or data platforms sometimes provide support for UDFs that enable such systems to perform operations that are not available through the built-in, system-defined functions. Existing techniques for the execution of UDFs, however, may lack robust security mechanisms for mitigating the associated security risks and ensuring that the user code is executed securely and with sufficient visibility for auditing.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
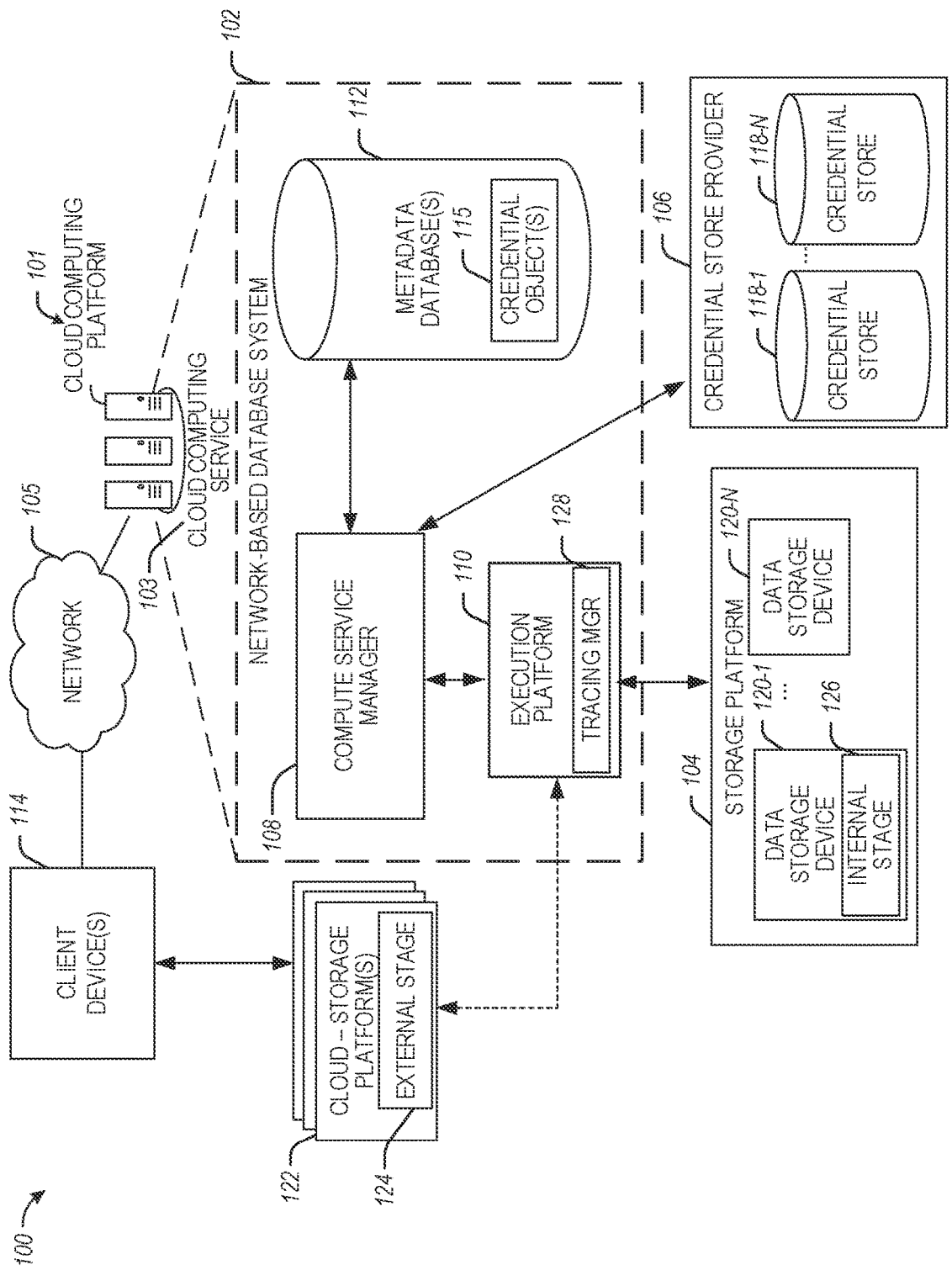
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

In computer security, a sandbox (e.g., sandbox environment) is a security mechanism for separating running programs, usually to mitigate system failures or software vulnerabilities from spreading. A sandbox (also referred to as a sandbox process) can be used to execute untested or untrusted programs or code, possibly from unverified or untrusted third parties, suppliers, users, or websites, without risking harm to the host machine or operating system. A sandbox can provide a tightly controlled set of resources for guest programs to run in, such as storage and memory scratch space. Network access, the ability to inspect the host system or read from input devices can be disallowed or restricted.

Existing approaches to sandbox environments and supervising functions in database systems may not adequately provide visibility of security mechanisms during the execution of code in a given user-defined function (UDF). As a result, such approaches leave database systems more vulnerable to breaches in system integrity since there is limited visibility for auditing and logging system calls that are malicious and have been blocked. Moreover, existing security mechanisms and supervising functions do not perform key functionalities including advanced argument inspection and accounting on the number of specific system calls, auditing system calls with malicious arguments, custom filtering based on pre-configured filtering policies, or emergency response and notification for malicious system calls or newly discovered kernel vulnerabilities.

Aspects of the present disclosure address the above and other deficiencies of providing visibility on malicious system calls made by UDFs and extensive control over system call execution. More specifically, a tracing manager (also referred to as a tracing function or a tracing management function) can be configured to monitor and audit malicious system calls associated with user code runtime for a UDF, as well as report and analyze them retrospectively. The tracing manager can instantiate a sandbox process as a child process (of the tracing manager), and the sandbox process can instantiate a user code runtime as a child process (of the sandbox process). The user code runtime can include a Java Virtual Machine (JV), a Python runtime, or another type of runtime for executing user code of a UDF. The user code runtime can be configured with a filtering process with different categories of system call lists, which may be passed onto an operating system (OS) manager (e.g., an OS kernel). The OS manager monitors the execution of system calls of the UDF associated with a received compute request and notifies the tracing manager of system calls based on the system call lists. The tracing manager can further inspect the system call and determine a subsequent operation, including resuming the system call, blocking the system call, logging the system call, communicating a notification (e.g., exception) to a user device originating the compute request, etc. In this regard, the disclosed techniques associated with the tracing manager allow monitoring of system calls on production workloads, as well as provide visibility and reporting to the network-based database system user (e.g., permission denied for a specific reason). The disclosed techniques can be used for performing argument inspection for system calls in user code runtime environments using specifications on which argument is allowed or blocked. Additionally, the disclosed techniques can be used for tracing system calls (e.g., fork or clone system calls) to allow control of the number of processes or threads allowed in UDFs, as well as logging system calls that are selected based on pre-configured filtering criteria.

To address shortcomings of prior system call monitoring implementations which lack visibility on malicious system calls made by UDFs, disclosed herein are various embodiments of systems and methods for tracing the execution of UDF system calls in a secure computing environment such as a network-based database system. The various embodiments that are described herein are described with reference where appropriate to one or more of the various figures.

An example computing environment using a tracing manager for tracing the execution of UDF system calls is discussed in connection with FIGS. 1-4. Example communication exchanges and event handling associated with tracing the execution of system calls in a computing environment are discussed in connection with FIGS. 5-7. A more detailed discussion of example computing devices that may be used is provided in connection with FIG. 8.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, a storage platform 104, and credentials store provider 106. The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., tracing the execution of UDF system calls and associated reporting). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 105, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110. In some embodiments, the execution platform includes a tracing manager 128 for tracing the execution of UDF system calls in the network-based database system 102. A more detailed description of the tracing manager and the functions performed in connection with tracing the execution of UDF system calls is provided in connection with FIG. 4-FIG. 7.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 processes the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
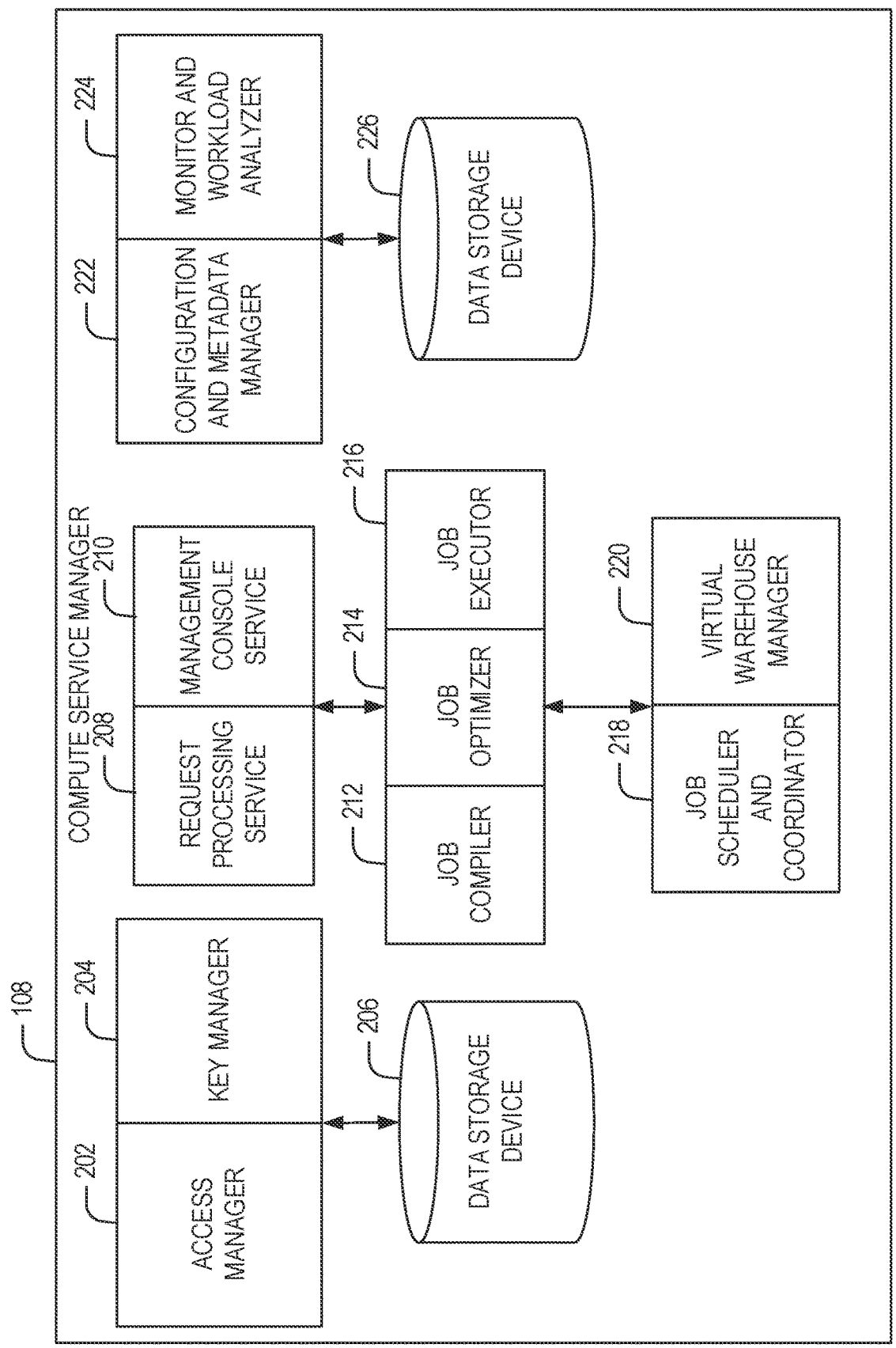
FIG. 2 is a block diagram illustrating the components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
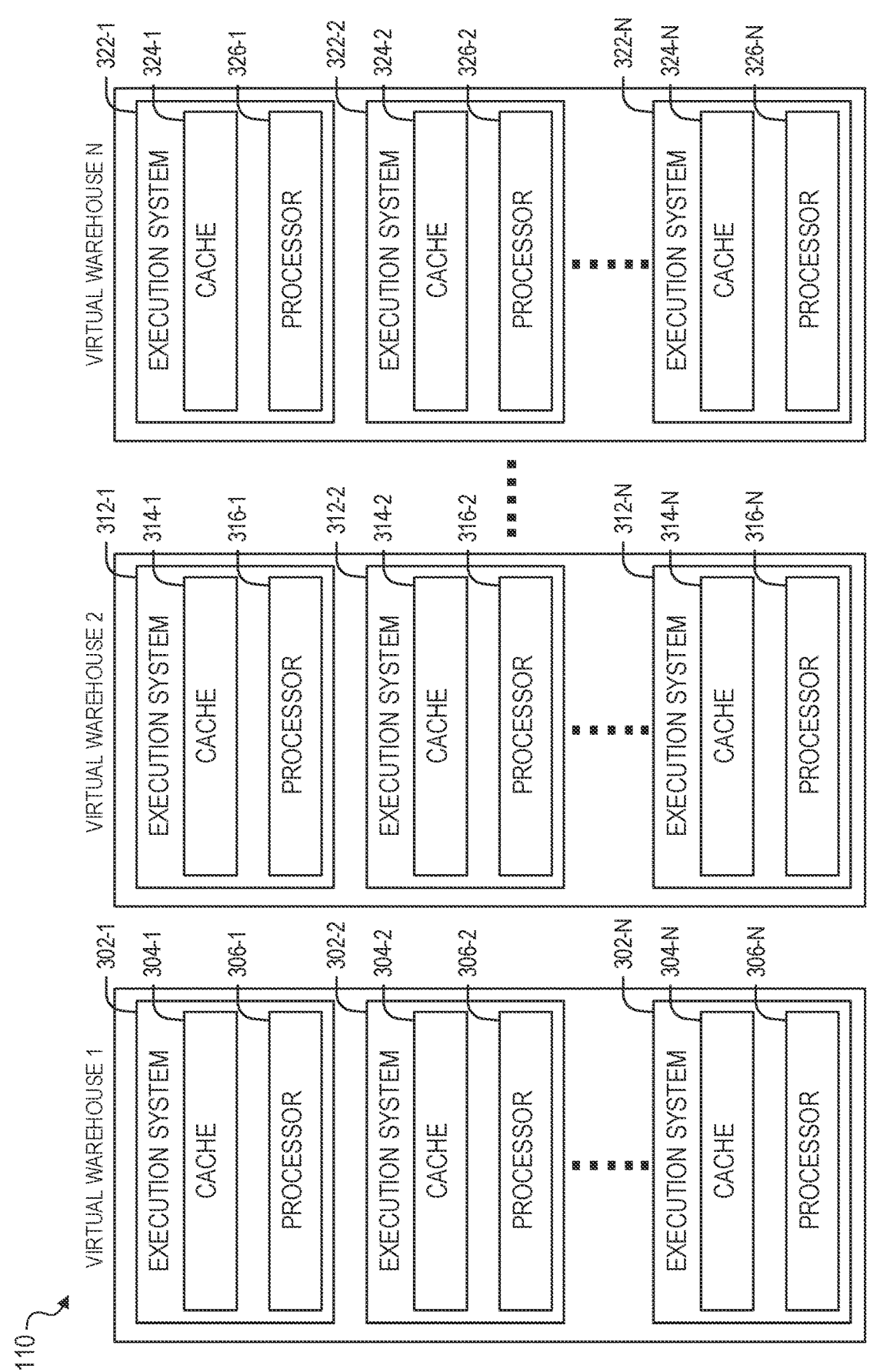
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301.1), virtual warehouse 2 (or 301.2), and virtual warehouse N (or 301.N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
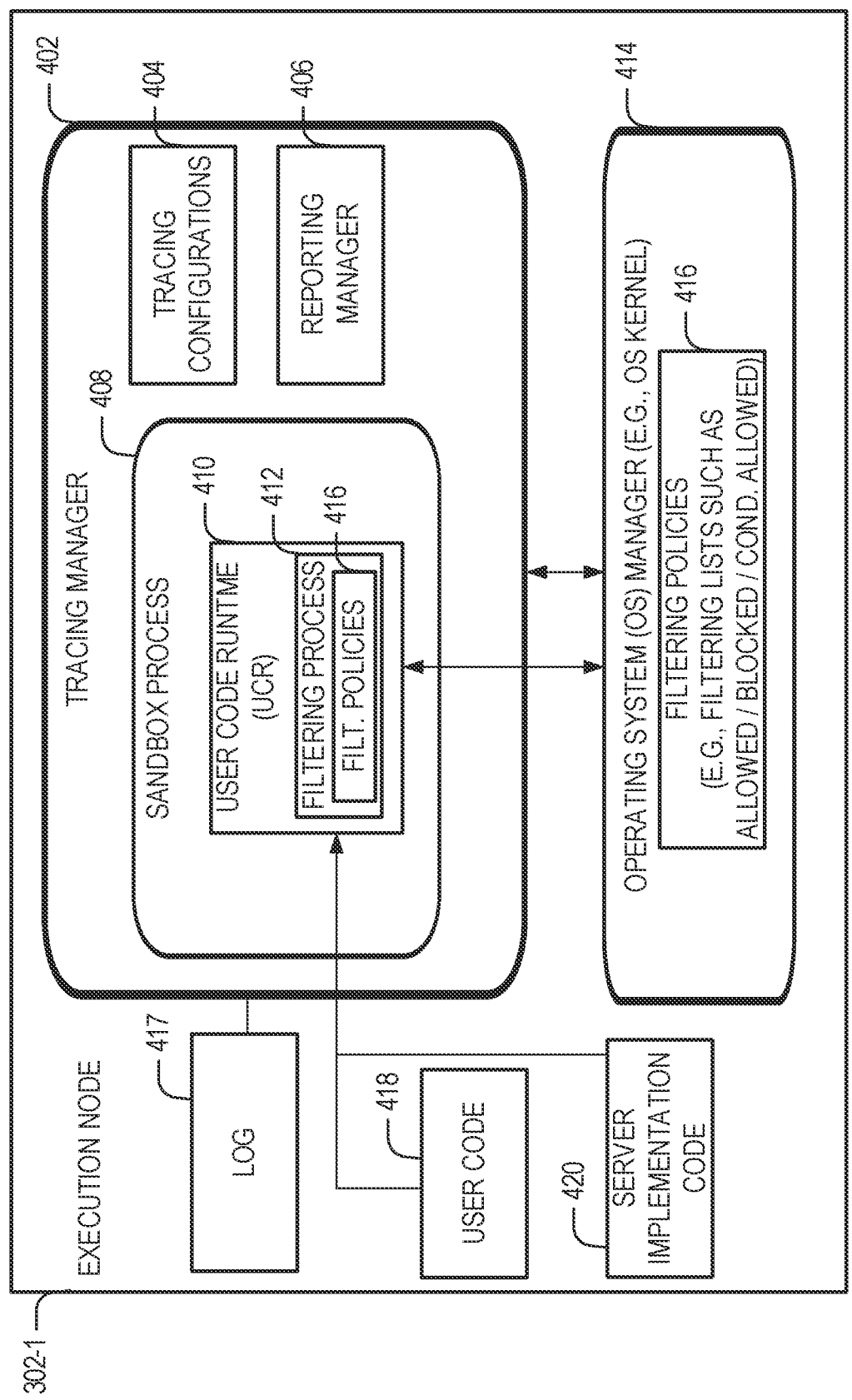
FIG. 4 is a computing environment conceptually illustrating an example software architecture executing a user-defined function (UDF) by a tracing manager running on a given execution node of the execution platform of FIG. 3, in accordance with some embodiments of the present disclosure.

FIG. 4 is a computing environment conceptually illustrating an example software architecture executing a user-defined function (UDF) by a tracing manager running on a given execution node of the execution platform 110 of FIG. 3, in accordance with some embodiments of the present disclosure.

As illustrated, the execution node 302-1 from the execution platform 110 includes a tracing manager 402 (e.g., similar to tracing manager 128 of FIG. 1), which in an embodiment is running on the processor 306-1 and can also utilize memory from the cache 304-1 (or another memory device or storage). As mentioned herein, a "process" or "computing process" can refer to an instance of a computer program that is being executed by one or more threads by an execution node or execution platform.

The tracing manager 402 comprises suitable circuitry, logic, interfaces, and/or code and is configured to perform functionalities in connection with the tracing execution of UDF system calls. More specifically, the tracing manager 402 is configured to perform functionalities (e.g., as described in connection with FIG. 5-FIG. 7), including monitoring child processes, providing visibility to malicious system calls, accounting for a number of times specific system calls are being executed, auditing system calls with malicious arguments, enforcing system call filtering policies (e.g., filtering policies 416), and providing reporting and emergency response to OS kernel vulnerabilities.

In some aspects, a malicious system call may be blocked by a filtering process within the execution node 302-1, which leads to a failure or unknown behavior in the user code. In this case, the tracing manager 402 within the execution node 302-1 is configured to provide visibility on which system call is blocked and it may report the root cause to the user for further retrospective analysis.

In other aspects, some system calls are allowed for execution but using them aggressively can lead to problems. For example, forking a large number of processes (especially in a PYTHON-based environment) can be considered malicious behavior. The tracing manager 402 within the execution node 302-1 is configured to audit such system calls and generate a user error if the number of calls is over a predefined threshold range.

In additional aspects, the tracing manager 402 is configured to block the loading of some shared libraries in UDF code that are being executed within the execution node 302-1, check what library the user code tries to load (e.g., in a dlopen command), block the library that is not allowed, and then report to the user why their code fails in this case. An additional consideration when performing argument inspection by the tracing manager 402 includes ensuring that any values passed by reference (i.e., a pointer to the address of the value in a sandboxed process' memory) are not modified by other threads within the sandboxed process.

In further aspects, the tracing manager 402 within the execution node 302-1 is configured to report or provide an emergency response (e.g., to an OS kernel vulnerability) by temporarily blocking parameters to a system call with known exploitable patterns until a patched OS kernel can be deployed.

As illustrated in FIG. 4, the tracing manager includes a sandbox process 408. In some example embodiments, the sandbox process 408 is configured to execute as a child process (or a sub-process) of the tracing manager 402. The sandbox process 408 includes a user code runtime 410 with a filtering process 412. In some embodiments, the user code runtime 410 is configured to execute as a child process (or a sub-process) of the sandbox process 408. The tracing manager is in communication with an OS manager (e.g., OS kernel) 414 and also has access to log 417, user code 418, and server implementation code 420. In some embodiments, to achieve user isolation, the user code runtime 410 and the filtering process 412 are operated by a Linux user (e.g., using client device 114).

The sandbox process 408, in an embodiment, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 408 is optimized (e.g., closely coupled to security mechanisms of the OS kernel 414 via the user code runtime 410) to process a database query securely within a sandbox environment.

In an embodiment, the sandbox process 408 can utilize a virtual network connection to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 408 can be understood as providing a constrained computing environment for a process (or processes), such as the user code runtime 410 executing UDF code within the sandbox, where these constrained processes can be controlled and restricted to limit access to the OS kernel 414 and certain computing resources.

Examples of security mechanisms used by the tracing manager 402 and the OS kernel 414 can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. In some aspects, the sandbox process 408 can utilize a sandbox policy to enforce a given security policy. The sandbox policy can be a file with information related to a configuration of the sandbox process 408 and details regarding restrictions if any, and permissions for accessing and utilizing system resources. Example restrictions can include restrictions to network access, or file system access (e.g., remapping file system to place files in different locations that may not be accessible, other files can be mounted in different locations, and the like). The sandbox process 408 may restrict the memory and processor (e.g., CPU) usage of the user code runtime 410, ensuring that other operations on the same execution node can execute without running out of resources. Additional system call tracing and filtering functions are performed by the filtering process 412 and the OS kernel 414 (e.g., using the filtering lists in the filtering policies 416) as further detailed in connection with FIG. 5 and FIG. 6.

In some aspects, user code 418 may be provided as a package e.g., in the form of a JAR (JAVA archive) file which includes code for one or more UDFs. Server implementation code 420, in an embodiment, is a JAR file that initiates a server that is responsible for receiving requests from the user code runtime 410, assigning worker threads to execute user code, and returning the results, among other types of server tasks.

In an implementation, an operation from a UDF (e.g., JAVA-based UDF) can be performed by the user code runtime 410 executing within the sandbox process 408. In an embodiment, the user code runtime 410 is implemented as a virtual machine, such as a JAVA virtual machine (JVM). In some embodiments, the user code runtime 410 is implemented as a PYTHON runtime or another type of runtime. In further embodiments, results of performing an operation based on the UDF, among other types of information or messages, can be stored in log 417 for review and retrieval. In an embodiment, the log 417 can be stored locally in memory at the execution node 302-1, or a separate location such as the storage platform 104.

The tracing manager 402 further includes tracing configurations 404 and a reporting manager 406. The tracing configurations 404 can include filtering policies 416 which are passed onto the sandbox process 408 and then to the user code runtime 410 for inclusion in the filtering process 412. In some embodiments, the filtering policies 416 include filtering lists (e.g., lists of allowed system calls, blocked system calls, and conditionally allowed system calls) which are also communicated to the OS kernel 414 (e.g., as discussed in connection with FIG. 5). In addition to the filtering policies 416, the tracing configurations 404 may also include additional configurations associated with tracing and other system call processing functions performed by the tracing manager 402 (e.g., example malicious arguments to monitor, threshold ranges for allowed repletion of certain system calls, identification of allowed and non-allowed use of shared libraries in system calls, etc.).

The reporting manager 406 comprises suitable circuitry, logic, interfaces, and/or code and is configured to provide visibility to malicious system calls including storing a log entry in log 417 (e.g., for subsequent system call auditing), generating an exception or another notification for communication to another process within the execution platform 110 and/or to the client device 114 associated with the UDF.

Although the above discussion of FIG. 4 describes components that are implemented using JAVA (e.g., object-oriented programming language), it is appreciated that the other programming languages (e.g., interpreted programming languages) are supported by the tracing manager 402. In an embodiment, PYTHON is supported for implementing and executing UDFs in the computing environment of the tracing manager 402. In this example, the user code runtime 410 can be replaced with a PYTHON interpreter for executing operations from UDFs (e.g., written in PYTHON) within the sandbox process 408.

Figure 5:
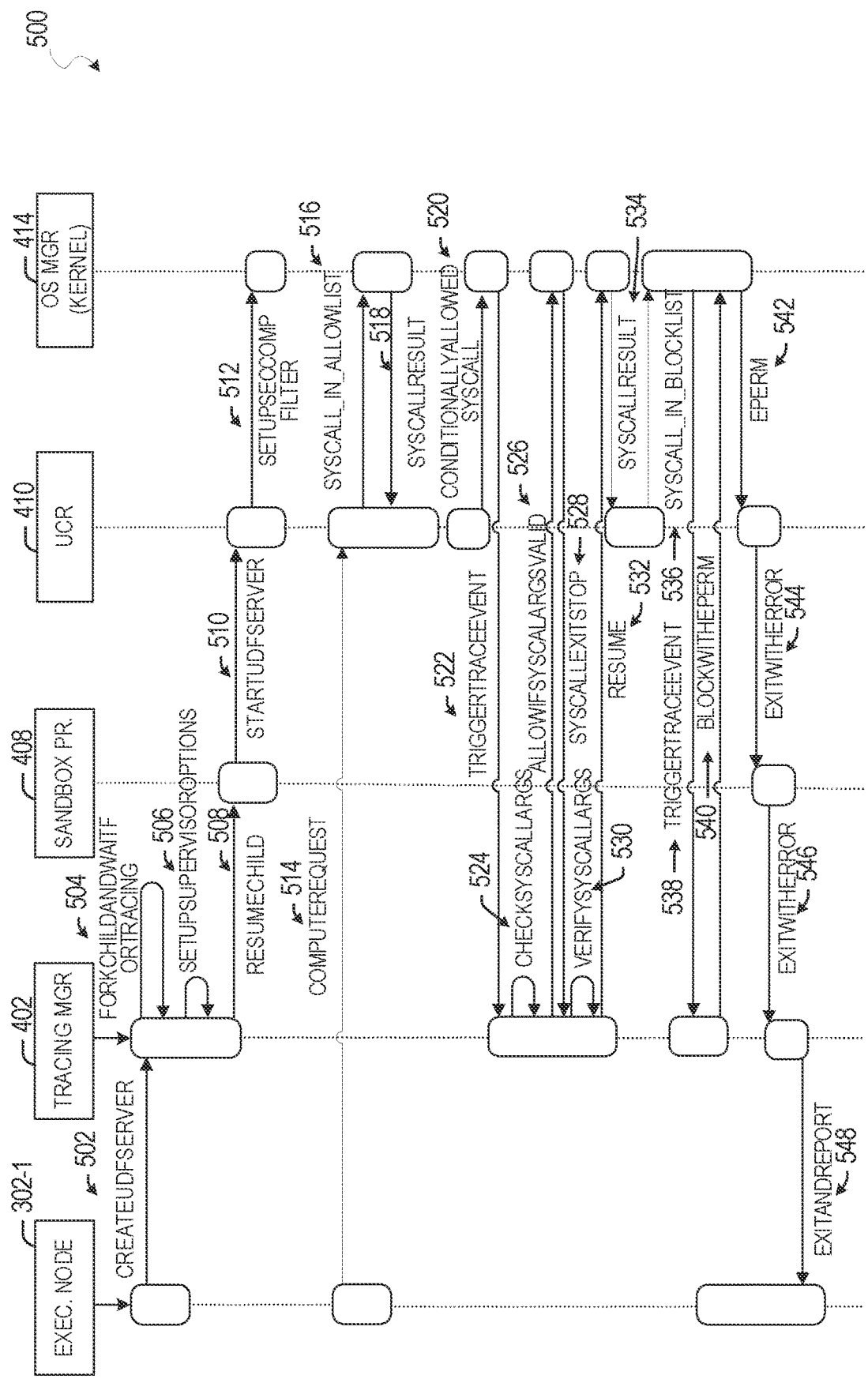
FIG. 5 is a swimlane diagram of example communication sequences in connection with tracing functions performed by a tracing manager within a database system, in accordance with some embodiments of the present disclosure.

FIG. 5 is a swimlane diagram of example communication sequences 500 in connection with tracing functions performed by the tracing manager 402 within a database system, in accordance with some embodiments of the present disclosure. Referring to FIG. 5, the communication sequences 500 take place between the execution node 302-1, the tracing manager 402 and its child processes (e.g., the sandbox process 408 and the user code runtime, or UCR, 410), and the OS manager 414 (also referred to as OS kernel).

During initialization, at operation 502, the execution node 302-1 starts the tracing manager 402 (e.g., indicated in FIG. 5 as CreateUDFServer) with all arguments (which may be part of the tracing configurations 404) needed for setting up the sandbox process 408 and the UCR 410. Before executing the sandbox process 408, at operations 504 and 506 (indicated in FIG. 5 as ForkChildAndWaitForTracing and SetupSupervisorOptions), the tracing manager 402 first configures to ensure the child process forked from it, or any child forked from this child, is traced by the tracing manager 402. In some example embodiments, the tracing configurations 404 include the filtering policies 416. Additionally, the tracing configurations 404 are configured by the execution node 302-1 and are used for initializing the tracing manager (e.g., at operation 506).

After that, the tracing manager 402 resumes the child sandbox process 408 (at operation 508, indicated in FIG. 5 as ResumeChild), which executes the UCR 410 of the UDF as its child process inside the sandbox process 408 (at operation 510, indicated in FIG. 5 as StartUDFServer). Additionally, the UCR 410 is configured with the filtering process 412, which includes the filtering policies 416.

At operation 512, the UCR 410 configures the OS kernel 414 with the filtering policies 416 (indicated in FIG. 5 as SetupSeccompFilter) so that the UCR 410 may be restricted based on such policies.

In some embodiments, the filtering policies 416 include a plurality of filtering lists, each filtering list associated with a corresponding plurality of system call categories that trigger different processing by the tracing manager 402. For example, the filtering policies 416 include an allowed list of system calls (e.g., the system calls in the allowed list, also referred to as allowed system calls, are associated with an allowed system call category), a blocked list of system calls (e.g., the system calls in the blocked list, also referred to as blocked system calls, are associated with a blocked system call category), a fatally blocked list of system calls (e.g., the system calls in the fatally blocked list, also referred to as fatally blocked system calls, are associated with a fatally blocked system call category), and a conditionally allowed list of system calls (e.g., the system calls in the conditionally allowed list, also referred to as conditionally allowed system calls, are associated with a conditionally allowed system call category).

In some example embodiments, a system call in the allowed system call category is applied with a Seccomp_Ret_Allow action and is executed by the OS kernel 414 without any tracing by the tracing manager 402.

In some example embodiments, a system call in the blocked system call category is applied with a Seccomp_Ret_Trace action by the OS kernel 414 so that the system call will be traced by the tracing manager 402 with error reporting (e.g., EPERM). For example, a system call in the blocked system call category, the caller (e.g., UCR 410) will be paused at the syscall-entry-stop and the filtering process 412 allows the tracing manager 402 to capture it and perform a remedial action based on the tracing configurations 404. For example, the tracing manager 402 can log or block the system call, or even terminate the UDF process.

In some example embodiments, a system call in the fatally blocked system call category is also applied with a Seccomp_Ret_Trace action by the OS kernel 414 so that the system call will be traced by the tracing manager 402 with error reporting (e.g., EPERM) and logging (e.g., in log 417). Additionally, the tracing manager 402 may also generate a "permission denied" exception to the client device (or user) for the system call in the fatally blocked system call category.

In some embodiments, a system call in the conditionally allowed system call category is subject to tracing by the tracing manager 402 and may be allowed for execution if a certain policy (e.g., parameter inspection or other policies which may be configured as part of the tracing configurations 404).

At operation 514, a data processing operation (indicated as ComputeRequest in FIG. 5) associated with the UDF is received by the UCR 410 (which executes the UDF code). Once the filtering policies 416 (with the filtering lists) are configured (e.g., as part of the filtering process 412) inside the UCR 410 and the OS kernel 414, all system calls of the data processing operation in the allowed list of system calls will be performed by the OS kernel 414. For example, a system call in the allowed list of system calls (e.g., Syscall_In_Allowlist) is communicated to the OS kernel 414 at operation 516, the system call is then executed, and a result of the execution (e.g., SyscallResult) is communicated back to the UCR 410 at operation 518.

Referring to FIG. 5, processing of system calls in the conditionally allowed list of system calls is performed by operations 520-534, processing of system calls in the blocked list of system calls is performed by operations 536-540, and reporting functions are performed by operations 542-548.

At operation 520, a system call in the conditionally allowed list of system calls (e.g., ConditionallyAllowedSyscall) is communicated to the OS kernel 414. For conditionally allowed system calls, the system call may be paused at the syscall-entry-stop and the tracing manager 402 may inspect its arguments. If the arguments are invalid, the system call is blocked (similar to the processing of system calls in the blocked list. Otherwise, the tracing manager 402 will let the conditionally allowed system call resume but will keep tracing it at the syscall-exit-stop. More specifically, at operation 522, the OS kernel 414 detects (e.g., using filtering policies 416) that the received system call is conditionally allowed, and triggers a tracing event (indicated as TriggerTraceEvent in FIG. 5). The tracing manager 402 checks the conditionally allowed system call arguments at operation 524 (indicated as CheckSyscallArgs in FIG. 5). For example, the tracing manager 402 checks whether the argument is associated with a shared library (e.g., the tracing manager 402 checks dlopen's first argument which is a pointer to the filename string of the shared library). In some aspects, the configurations for the argument checks can be done when the tracing manager 402 is started (e.g., using the tracing configurations 404).

In some embodiments, the conditionally allowed system call may be allowed to proceed based on the number of times it has been executed. In this regard, at operation 524, the tracing manager 402 may also check the number of times the conditionally allowed system call has been executed so far. If such a number is higher than a threshold, then the conditionally allowed system call is blocked (e.g., similar to operation 540).

If the arguments are valid, at operation 526, the tracing manager 402 allows the conditionally allowed system call to proceed (indicated as AllowIfSyscallArgsValid in FIG. 5). After the conditionally allowed system call is permitted to execute, at operation 528, the OS kernel 414 triggers a repeat check of the arguments by the tracing manager 402 (indicated as SyscallExitSTop in FIG. 5). At operation 530, the tracing manager 402 performs a verification of the arguments (indicated as VerifySyscallArgs in FIG. 5), and if the arguments are successfully verified, allows the conditionally allowed system call to proceed at operation 532 (indicated as Resume in FIG. 5). A result of the execution of the conditionally allowed system call by the OS kernel 414 is provided to the UCR 410 at operation 534 (indicated as SyscallResult in FIG. 5). If the arguments are not successfully verified, the tracing manager 402 may exit and terminate its child processes (e.g., the sandbox process 408 and the UCR 410).

At operation 536, a system call in the blocked list of system calls (e.g., Syscall_In_Blocklist) is communicated to the OS kernel 414. In response, at operation 538, the OS kernel 414 detects (e.g., using filtering policies 416) that the received system call is blocked, and triggers a tracing event (indicated as TriggerTraceEvent in FIG. 5). At operation 540, the tracing manager 402 blocks the system call (e.g., based on the tracing configurations 404) with error reporting (indicated as BlockWithEPERM in FIG. 5). In some aspects, blocking with error reporting (as done in operation 540) is also performed in connection with fatally blocked system calls or conditionally allowed system calls (e.g., if the argument verifications at operations 524 and 530 fail).

After the OS kernel 414 receives (e.g., at operation 540) the indication of a blocked system call with reporting, at operation 542, the OS kernel communicates an error indication (e.g., an indication of operation not permitted, or EPERM, in FIG. 5) to the UCR 410. When the UCR 410 receives the EPERM, it can either notice it and continue or exit the system call (e.g., as done at operation 544) when the system call is associated with a critical processing path. The exit with error reporting (also indicated as ExitWithError and ExitAndReport) is also performed by the UCR 410, the sandbox process 408, and the tracing manager at corresponding operations 544, 546, and 548. In some aspects, any tracing, error detection, system call blocking, or allowance may be recorded by the reporting manager 406 (e.g., using the log 417 and/or communicating a separate notification within or outside the execution node 302-1). In this regard, the execution node 302-1 (or a different execution node) may access prior reports associated with the system call tracing functions of the tracing manager 402.

In some aspects associated with operations 542-548, the UCR 410 may exit and the sandbox process 408 may also exit (e.g. because it keeps monitoring the signal from its child and will exit right after its child exits). Similarly, the tracing manager 402 may also exit when it notices that the sandbox process 408 exits. In this case, the tracing manager 402 does not need to kill the UCR 410 and the sandbox process 408. In other aspects, when the execution node 302-1 instructs the tracing manager 402 to shut down, then the tracing manager 402 may kill (or terminate) the UCR 410 and the sandbox process 408. For example, after a database query operation associated with a UDF is finished (or some timeout occurs thereafter), the execution node 302-1 may decide to shut down the tracing manager 402 and its associated child processes. The tracing manager 402 then receives a command from the execution node 302-1 and shuts down all its child processes if they are still alive.

Referring to FIG. 4 and FIG. 5, in some embodiments, the reporting manager 406 is configured to report (with the visibility introduced by the tracing manager 402) system call tracing status including which system calls have been blocked as well as the reason for blocking. In some embodiments, the reporting manager 406 may utilize the following endpoints for reporting: execution node logs and statistics, user error messages, and UDF logging.

In connection with execution node logs and statistics, the reporting manager 406 is configured to report the malicious/blocked system calls to a log (e.g., log 417). Entries in log 417 may be used for retrospective analysis and monitoring.

In connection with a user error message, if a query fails due to a malicious system call, the reporting manager 406 is configured to rephrase the error message to the client device (and the user) and indicate which system call is blocked in their UDF. In this way, the system call issue may be easily located and debugged.

In connection with UDF logging, the tracing manager 402 is configured to report the malicious system call from the UDF not only to the UDF user but to the UDF developer as well.

In some example embodiments, the tracing manager is configured to perform functionalities in connection with emergency response to zero-day vulnerabilities, which may occur in Linux system calls. For example, the tracing configurations 404 (and the filtering policies 416) are updated to block the zero-day vulnerable system call by introducing a new parameter. The parameter may be used for defining a list of system calls that need to be blocked immediately. When a new UDF query starts, the UCR 410 can load this list to the filtering policies 416. For example, assuming a system call A is allowed in the static (or compiled) filtering policy 416. Upon an indication that this system call is no longer safe, attempts for executing the system call have to be blocked promptly. In this regard, the parameter may be altered to add system call A into the list of system calls to be blocked immediately. When the next UCR 410 starts, it first loads the static policy (e.g., filtering policies 416) to the filtering process 412, and then it also loads the policy generated in runtime from the parameter. In some aspects, the list of system calls that need to be blocked immediately may be part of the filtering policies 416 and may be updated dynamically (e.g., upon receiving a notification by the tracing manager 402 or the UCR 410 that a system call is now being considered malicious even though previously it was not). Now both filtering policies contain A in both an allowed system call list and a blocked system call list. If system call A is presented for execution, the filtering process 412 may process the system call based on priority (e.g., if the system call is on both lists, the system call will be blocked as the list of system calls that need to be blocked immediately has higher priority than the static list). Thus, the parameter-based blocklist will be enforced to block the system call which used to be allowed in the static filtering policy.

Additional considerations may include how to block the system call for ongoing queries. Since a UDF may be processed in mini-batches (e.g., based on row sets), the newly changed blocklist may be dynamically loaded into the UCR 410 at the next batch, so the policy can be applied immediately.

Figure 6:
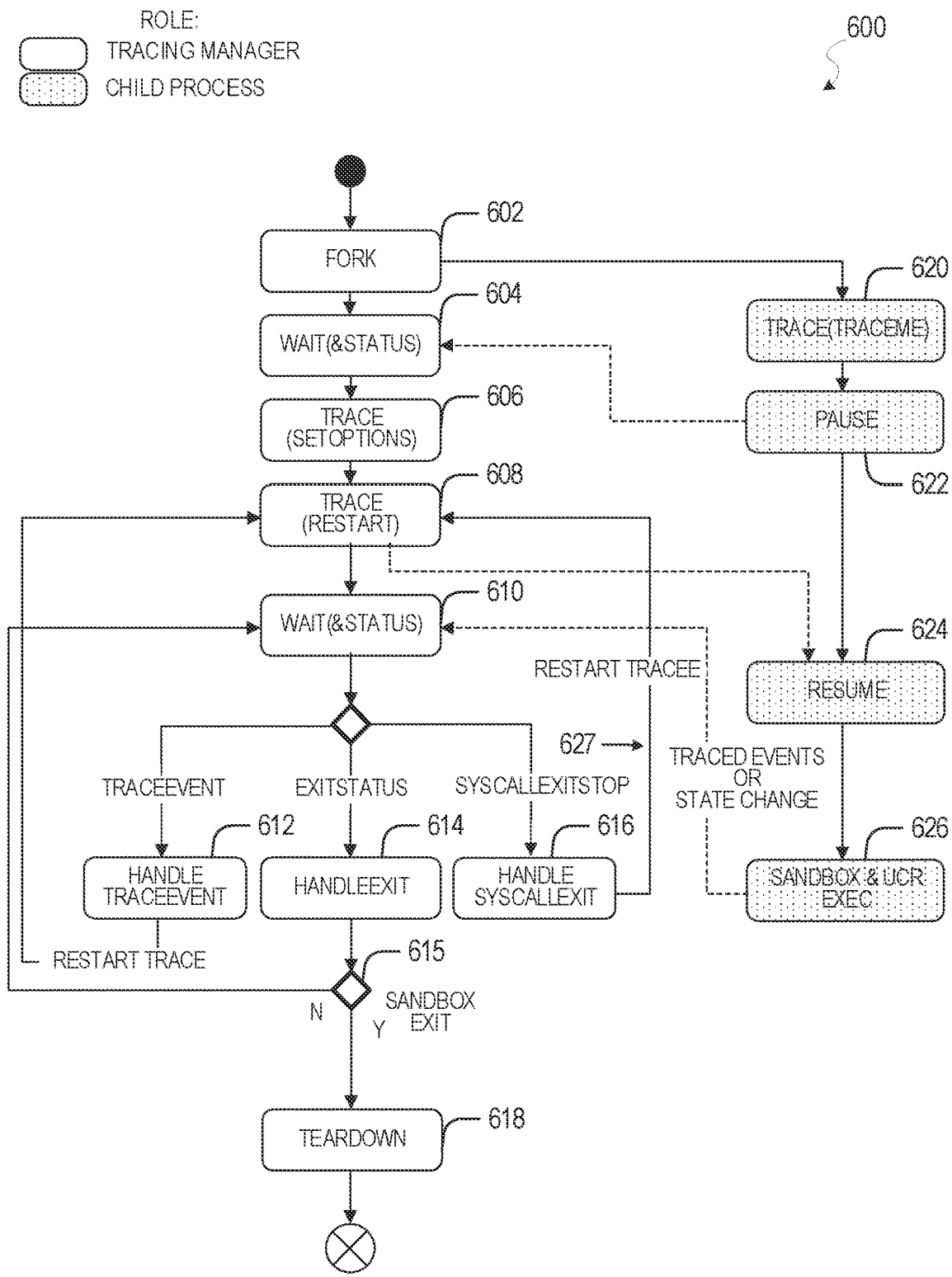
FIG. 6 is a flow diagram of event handling by a tracing manager and a child process, in accordance with some embodiments of the present disclosure.

FIG. 6 is a flow diagram 600 of event handling by a tracing manager and one or more child processes, in accordance with some embodiments of the present disclosure. Referring to FIG. 6, events (or operations) 602-618 are performed by the tracing manager 402, and operations 620-627 are performed by one or more child processes of the tracing manager 402 (e.g., sandbox process 408 and UCR 410).

The flow diagram 600 focuses on how the tracing manager 402 continuously pauses the child processes, traces a system call, and then resumes the child processes. More specifically, flow diagram 600 shows how the tracing manager 402 interacts with a child process from setting up a trace to handling trace events, and then eventually terminates. The core of the operation of the tracing manager 402 is covered in a for loop (i.e., the trace(restart) operation 608, the wait(&status) operation 610, and handlers associated with operations 612, 614, and 616.

At operation 602, the tracing manager 402 instantiates its child processes (e.g., sandbox process 408 and UCR 410 for UDF code). At operation 620, the child processes are configured so they are traced by the tracing manager 402, and then the child processes are paused at operation 622.

At operation 604 (indicated as wait(&status) in FIG. 6), the tracing manager 402 waits to receive a notification from an OS manager (e.g., OS kernel 414) of a system call of at least one operation associated with the UDF is presented for execution.

At operation 606, the tracing manager 402 is configured with tracing options (e.g., using the tracing configurations 404). At operation 608, the tracing manager 402 initiates tracing of the system call to determine whether performing the system call is permitted based on a plurality of filtering policies (e.g., filtering policies 416). Assuming the child process is already paused at the beginning of the loop (at operation 622), the tracing manager 402 may resume it (at operation 624), the child processes resume at operation 626, and the tracing manager 402 suspends itself at operation 610 (indicated as wait(&status) in FIG. 6) until any state changes happen from the child processes (at operation 627). Then the tracing manager 402 may resume the trace at operation 608. The tracing manager 402 can parse the state change (e.g., a trace event handled at operation 612, an exit status resulting in operation 614 for handling an exit, system call exit-stop resulting in operation 616 for handling a system call exit, etc.) and handle it accordingly. If operation 614 is performed (for handling an exit), at operation 615 the tracing manager 402 may determine whether to exit the sandbox process 408. If a determination is made not to exit, processing may resume at operation 610 (waiting for tracing event or state change). If a determination is made to exit, then a teardown operation 618 is performed to terminate the child processes (e.g., the sandbox process 408 and the UCR 410).

As illustrated in FIG. 6, an allowed system call will continue without blocking by the tracing manager 402. Instead, a blocked system call will be paused (e.g., by a SIGTRAP command with SECCOMP_RET_DATA(1)) so then the tracing manager 402 can trace and capture these values at this trace-event-stop (similar to a syscall-entry-stop), access the register, set the syscall with an invalid one to avoid execution, and set the result to be -EPERM to block it.

Similarly, for conditionally allowed system calls, such system calls will be paused too (e.g., with a SECCOMP_RET_DATA command) to indicate this is a conditionally allowed system call. In some aspects, parameter inspection may be performed by the tracing manager 402. Additionally, the tracing manager 402 may be configured to verify the values do not change at the syscall-exit-stop to minimize the attack that another thread may modify the value after the system call trace and verification.

Figure 7:
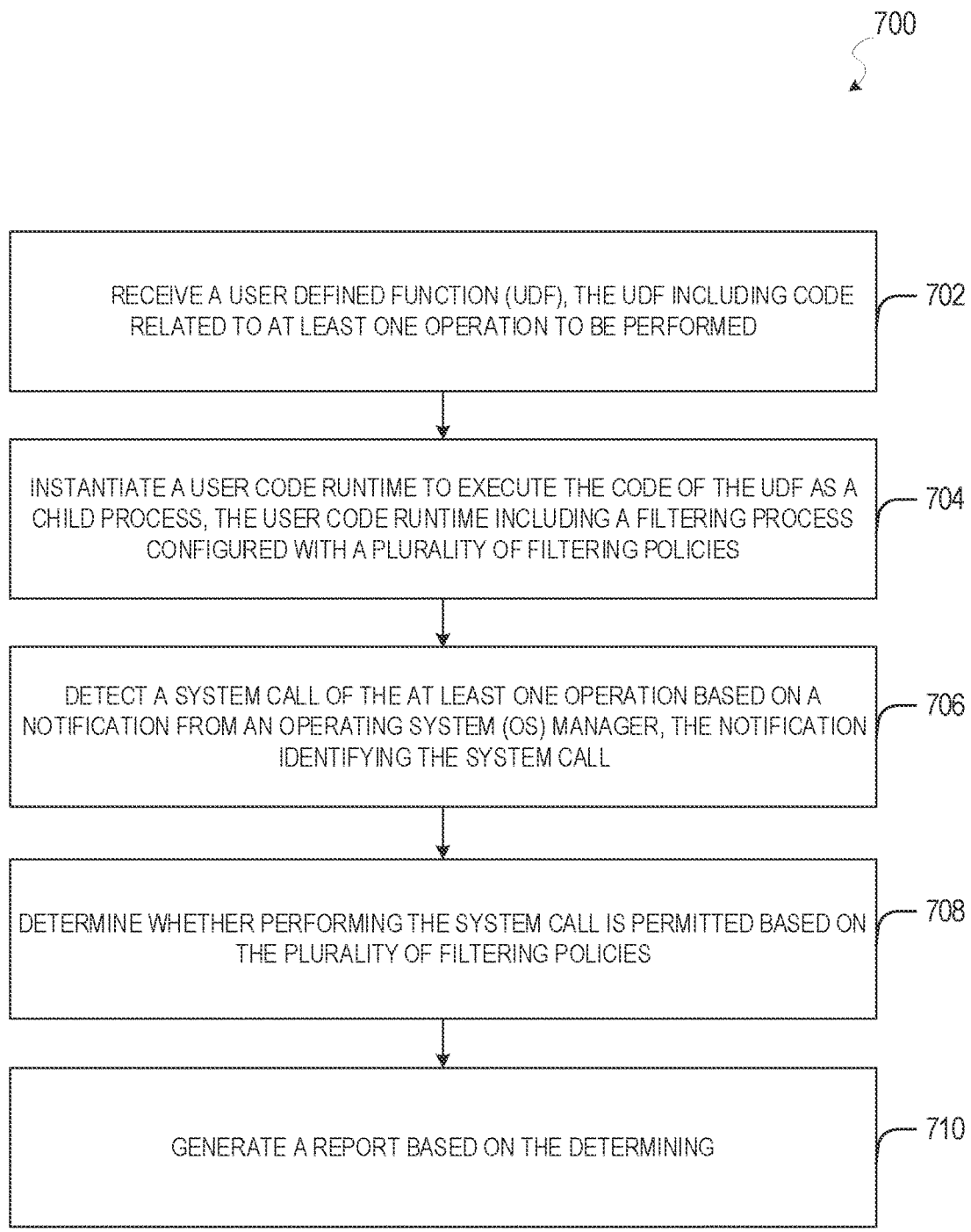
FIG. 7 is a flow diagram illustrating operations of a database system in performing a method for tracing the execution of UDF system calls in a secure computing environment, in accordance with some embodiments of the present disclosure.

FIG. 7 is a flow diagram illustrating operations of a database system in performing a method 700 for tracing the execution of UDF system calls in a secure computing environment, in accordance with some embodiments of the present disclosure. Method 700 may be embodied in computer-readable instructions for execution by one or more hardware components (e.g., one or more processors) such that the operations of the method 700 may be performed by components of network-based database system 102, such as components of the compute service manager 108 and/or the execution platform 110. Accordingly, method 700 is described below, by way of example with reference thereto. However, it shall be appreciated that method 700 may be deployed on various other hardware configurations and is not intended to be limited to deployment within the network-based database system 102.

At operation 702, a user-defined function (UDF) is received. The UDF includes code related to at least one operation to be performed. For example, the UDF code may be received by the execution node as user code 418.

At operation 704, a user code runtime (UCR) is instantiated to execute the code of the UDF as a child process. The UCR includes a filtering process configured with a plurality of filtering policies. For example, the execution node 302-1 starts the tracing manager 402, which instantiates a sandbox process as its child process. The sandbox process 408 instantiates the UCR 410 as its child process, with both child processes being traced by the tracing manager 402. The UCR 410 includes a filtering process 412 with a plurality of filtering policies 416.

At operation 706, a system call of the at least one operation is detected based on a notification from an OS manager, the notification identifying the system call. For example, after the at least one operation (e.g., a compute request or another type of data processing operation associated with a UDF) is received by the UCR 410 (e.g., at operation 514), a system call for the at least one operation is presented to the OS kernel 414 for execution. If the system call is on the blocked list, the fatally blocked list or the conditionally allowed list of system calls maintained by the OS kernel 414 as part of the filtering policies 416, the OS kernel 414 communicates a notification of the system call to the tracing manager 402 for performing tracing and verification functions.

At operation 708, a determination is made on whether performing the system call is permitted based on the plurality of filtering policies. For example, after the tracing manager 402 receives the notification identifying the system call from the OS kernel 414, the tracing manager 402 may perform a trace or other verification functions to determine whether the system call may resume or whether it should be blocked (e.g., operations 520-540 in FIG. 5).

At operation 710, a report is generated based on the determination. For example, the reporting manager 406 generates a report for communication within the execution node 302-1, to another execution node within the network-based database system 102, or the client device 114. Additionally, tracing and blocking results from functions performed by the tracing manager 402 may be recorded (e.g., for subsequent auditing and debugging) in log 417.

In some aspects, the tracing manager 402 is configured to instantiating the sandbox process 408 as a child process of the tracing manager 402. The tracing manager 402 is configured to perform the detecting of the system call and the determining of whether the system call is permitted. The UCR 410 is instantiated as a child process of the sandbox process. The sandbox process may be configured to execute the at least one operation in a sandbox environment.

In some embodiments, the plurality of filtering policies include an allowed list of system calls, the system calls in the allowed list associated with an allowed system call category; a blocked list of system calls, the system calls in the blocked list associated with a blocked system call category; a fatally blocked list of system calls, the system calls in the fatally blocked list associated with a fatally blocked system call category; and a conditionally allowed list of system calls, the system calls in the conditionally allowed list associated with a conditionally allowed system call category.

In some aspects, the OS kernel 414 is configured with the allowed list of system calls, the blocked list of system calls, the fatally blocked list of system calls, and the conditionally allowed list of system calls. The notification is generated based on a determination the system call is within one of the blocked list of system calls, the fatally blocked list of system calls, or the conditionally allowed list of system calls.

In some embodiments, the OS kernel 414 determines a second system call of the at least one operation is within the allowed list of system calls. The OS kernel 414 then performs the second system call without generating the notification to the tracing manager 402.

In some embodiments, determining whether performing the system call is permitted when the at least one operation is within the blocked list of system calls or the fatally blocked list of system calls, further includes performing a trace on the system call (e.g., by the tracing manager 402), verifying the at least one operation is within the blocked list of system calls or the fatally blocked list of system calls based on the trace and communicating a blocking instruction for the system call to the OS manager based on the verifying.

In some aspects, the execution of the system call is blocked based on the blocking instruction. In other aspects, generating the report includes storing a log entry of blocking the execution of the system call in a log (e.g., log 417).

In some embodiments, determining whether performing the system call is permitted when at least one operation is within the conditionally allowed list of system calls, further includes verifying one or more arguments of the system call are permitted based on the plurality of filtering policies; communicating a blocking instruction for the system call to the OS manager when the one or more arguments of the system call are not permitted; and communicating a resume instruction for resuming execution of the system call to the OS manager when the one or more arguments of the system call are permitted.

In some aspects, determining whether performing the system call is permitted when the at least one operation is within the conditionally allowed list of system calls, further includes verifying a number of times the system call has been previously executed is below a threshold number; communicating a blocking instruction for the system call to the OS manager, when the number of times the system call has been previously executed is above the threshold number; and communicating a resume instruction for resuming execution of the system call to the OS manager when the number of times the system call has been previously executed is equal to or below the threshold number.

Figure 8:
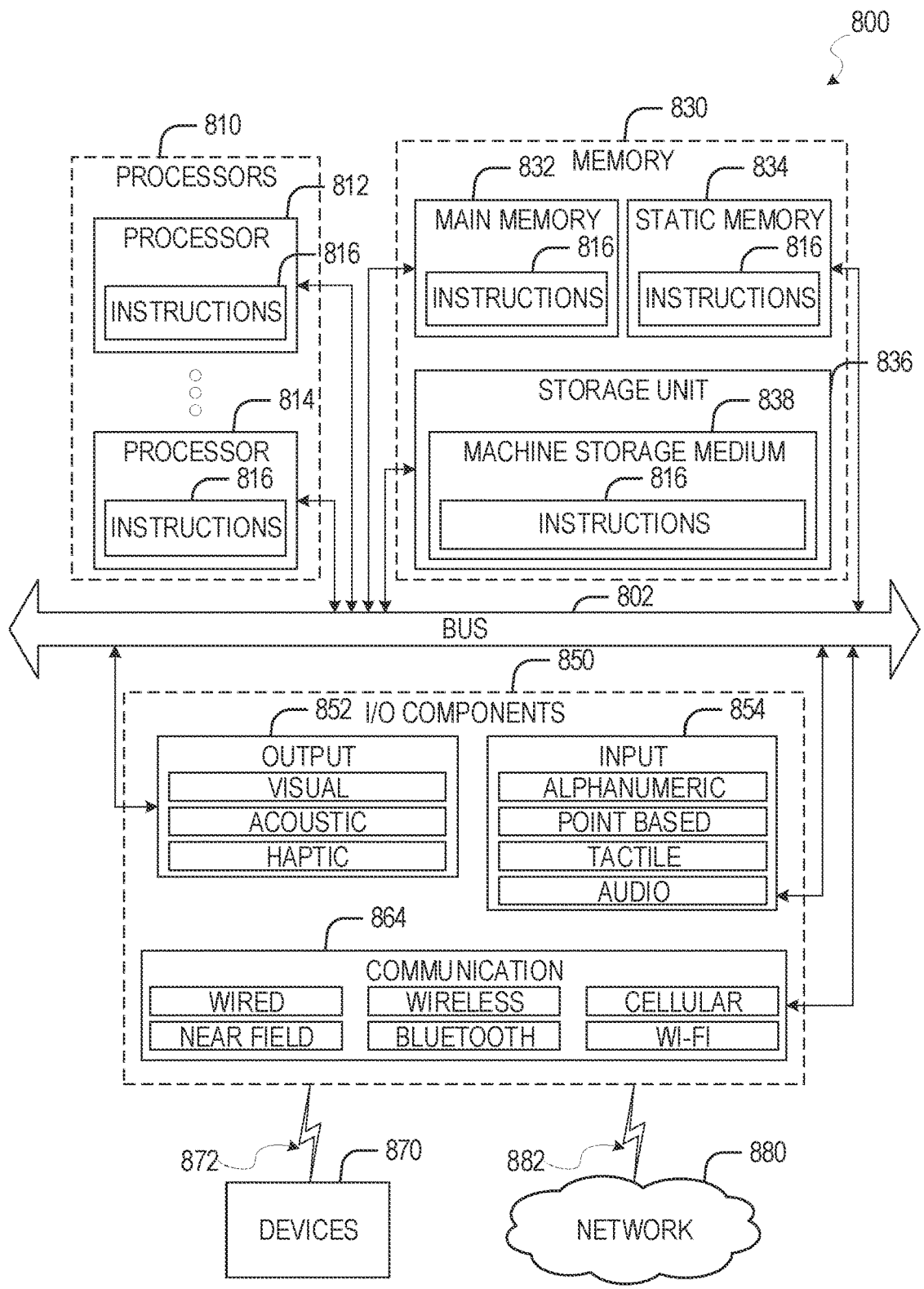
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, instructions 816 may cause machine 800 to execute any one or more operations of method 700 (or any other technique discussed herein, for example in connection with FIG. 4-FIG. 6). As another example, instructions 816 may cause machine 800 to implement one or more portions of the functionalities discussed herein. In this way, instructions 816 may transform a general, non-programmed machine into a particular machine 800 (e.g., the compute service manager 108 or a node in the execution platform 110) that is specially configured to carry out any one of the described and illustrated functions in the manner described herein. In yet another embodiment, instructions 816 may configure the compute service manager 108 and/or a node in the execution platform 110 to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

Machine 800 includes processors 810, memory 830, and input/output (I/O) components 850 configured to communicate with each other such as via a bus 802. In some example embodiments, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The device 870 may be another machine or any of a wide variety of peripheral devices (e.g., a peripheral device coupled via a universal serial bus (USB)). For example, as noted above, machine 800 may correspond to any one of the compute service manager 108 or the execution platform 110, and the devices 870 may include the client device 114 or any other computing device described herein as being in communication with the network-based database system 102 or the cloud storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of several well-known transfer protocols (e.g., hypertext transfer protocol (HTTP)). Similarly, instructions 816 may be transmitted or received using a transmission medium via the coupling 872 (e.g., a peer-to-peer coupling) to the device 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 700 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: receiving a user-defined function (UDF), the UDF including code related to at least one operation to be performed; instantiating, as a child process within a tracing manager, a user code runtime to execute the code of the UDF, the user code runtime including a filtering process configured with a plurality of filtering policies; detecting, by the tracing manager, a system call of the at least one operation based on a notification from an operating system (OS) manager, the notification identifying the system call; and determining, by the tracing manager, whether performing the system call is permitted based on the plurality of filtering policies.

In Example 2, the subject matter of Example 1 includes subject matter where the instructions further cause the at least one hardware processor to perform operations comprising: instantiating a sandbox process as a child process of the tracing manager; and instantiating the user code runtime as a child process of the sandbox process, the sandbox process configured to execute the at least one operation in a sandbox environment.

In Example 3, the subject matter of Examples 1-2 includes subject matter where the OS manager and the tracing manager are executed on a same execution node of an execution platform, and wherein the at least one operation is based on a database query.

In Example 4, the subject matter of Examples 1-3 includes, the operations further comprising: generating, by the tracing manager, a report based on the determining.

In Example 5, the subject matter of Examples 1-4 includes subject matter where the plurality of filtering policies include: an allowed list of system calls, the system calls in the allowed list associated with an allowed system call category; a blocked list of system calls, the system calls in the blocked list associated with a blocked system call category; a fatally blocked list of system calls, the system calls in the fatally blocked list associated with a fatally blocked system call category; and a conditionally allowed list of system calls, the system calls in the conditionally allowed list associated with a conditionally allowed system call category.

In Example 6, the subject matter of Example 5 includes subject matter where the instructions further cause the at least one hardware processor to perform operations comprising: configuring the OS manager with the allowed list of system calls, the blocked list of system calls, the fatally blocked list of system calls, and the conditionally allowed list of system calls; and generating the notification based on a determination the system call is within one of the blocked list of system calls, the fatally blocked list of system calls, or the conditionally allowed list of system calls.

In Example 7, the subject matter of Example 6 includes subject matter where the instructions further cause the at least one hardware processor to perform operations comprising: determining a second system call of the at least one operation is within the allowed list of system calls; and performing the second system call without notifying the tracing manager.

In Example 8, the subject matter of Examples 5-7 includes subject matter where to determine whether performing the system call is permitted when the at least one operation is within the blocked list of system calls or the fatally blocked list of system calls, the instructions further cause the at least one hardware processor to perform operations comprising: performing, by the tracing manager, a trace on the system call; verifying, by the tracing manager, the at least one operation is within the blocked list of system calls or the fatally blocked list of system calls based on the trace; and communicating a blocking instruction for the system call to the OS manager based on the verifying.

In Example 9, the subject matter of Example 8 includes subject matter where the instructions further cause the at least one hardware processor to perform operations comprising: blocking execution of the system call based on the blocking instruction; and storing a log entry of blocking the execution of the system call in a log.

In Example 10, the subject matter of Examples 5-9 includes subject matter where to determine whether performing the system call is permitted when the at least one operation is within the conditionally allowed list of system calls, the instructions further cause the at least one hardware processor to perform operations comprising: verifying, by the tracing manager, one or more arguments of the system call are permitted based on the plurality of filtering policies.

In Example 11, the subject matter of Example 10 includes subject matter where the instructions further cause the at least one hardware processor to perform operations comprising: communicating a blocking instruction for the system call to the OS manager, when the one or more arguments of the system call are not permitted; and communicating a resume instruction for resuming execution of the system call to the OS manager, when the one or more arguments of the system call are permitted.

In Example 12, the subject matter of Examples 10-11 includes subject matter where to determine whether performing the system call is permitted when the at least one operation is within the conditionally allowed list of system calls, the instructions further cause the at least one hardware processor to perform operations comprising: verifying a number of times the system call has been previously executed is below a threshold number.

In Example 13, the subject matter of Example 12 includes subject matter where the instructions further cause the at least one hardware processor to perform operations comprising: communicating a blocking instruction for the system call to the OS manager, when the number of times the system call has been previously executed is above the threshold number; and communicating a resume instruction for resuming execution of the system call to the OS manager, when the number of times the system call has been previously executed is equal to or below the threshold number.

Example 14 is a method comprising: receiving a user-defined function (UDF), the UDF including code related to at least one operation to be performed; instantiating a user code runtime to execute the code of the UDF as a child process, the user code runtime including a filtering process configured with a plurality of filtering policies; detecting a system call of the at least one operation based on a notification from an operating system (OS) manager, the notification identifying the system call; and determining whether performing the system call is permitted based on the plurality of filtering policies.

In Example 15, the subject matter of Example 14 includes, instantiating a sandbox process as a child process of a tracing manager, the tracing manager configured to perform the detecting of the system call and the determining of whether the system call is permitted; and instantiating the user code runtime as a child process of the sandbox process, the sandbox process configured to execute the at least one operation in a sandbox environment.

In Example 16, the subject matter of Examples 14-15 includes subject matter where the plurality of filtering policies include: an allowed list of system calls, the system calls in the allowed list associated with an allowed system call category; a blocked list of system calls, the system calls in the blocked list associated with a blocked system call category; a fatally blocked list of system calls, the system calls in the fatally blocked list associated with a fatally blocked system call category; and a conditionally allowed list of system calls, the system calls in the conditionally allowed list associated with a conditionally allowed system call category.

In Example 17, the subject matter of Example 16 includes, configuring the OS manager with the allowed list of system calls, the blocked list of system calls, the fatally blocked list of system calls, and the conditionally allowed list of system calls; and generating the notification based on a determination the system call is within one of the blocked list of system calls, the fatally blocked list of system calls, or the conditionally allowed list of system calls.

In Example 18, the subject matter of Example 17 includes, determining a second system call of the at least one operation is within the allowed list of system calls; and performing the second system call without generating the notification.

In Example 19, the subject matter of Examples 16-18 includes subject matter where the determining whether performing the system call is permitted when the at least one operation is within the blocked list of system calls or the fatally blocked list of system calls, further comprises: performing a trace on the system call; verifying the at least one operation is within the blocked list of system calls or the fatally blocked list of system calls based on the trace; and communicating a blocking instruction for the system call to the OS manager based on the verifying.

In Example 20, the subject matter of Example 19 includes, blocking execution of the system call based on the blocking instruction; and storing a log entry of blocking the execution of the system call in a log.

In Example 21, the subject matter of Examples 16-20 includes subject matter where the determining whether performing the system call is permitted when the at least one operation is within the conditionally allowed list of system calls, further comprises: verifying one or more arguments of the system call are permitted based on the plurality of filtering policies.

In Example 22, the subject matter of Example 21 includes, communicating a blocking instruction for the system call to the OS manager, when the one or more arguments of the system call are not permitted; and communicating a resume instruction for resuming execution of the system call to the OS manager, when the one or more arguments of the system call are permitted.

In Example 23, the subject matter of Examples 21-22 includes subject matter where the determining whether performing the system call is permitted when the at least one operation is within the conditionally allowed list of system calls, further comprises: verifying a number of times the system call has been previously executed is below a threshold number; communicating a blocking instruction for the system call to the OS manager, when the number of times the system call has been previously executed is above the threshold number; and communicating a resume instruction for resuming execution of the system call to the OS manager when the number of times the system call has been previously executed is equal to or below the threshold number.

In Example 24, the subject matter of Examples 14-23 includes, generating a report based on the determining.

Example 25 is a computer-storage medium comprising instructions that, when executed by one or more processors of a machine, configure the machine to perform operations comprising: receiving a user-defined function (UDF), the UDF including code related to at least one operation to be performed; instantiating a user code runtime to execute the code of the UDF as a child process, the user code runtime including a filtering process configured with a plurality of filtering policies; detecting a system call of the at least one operation based on a notification from an operating system (OS) manager, the notification identifying the system call; and determining whether performing the system call is permitted based on the plurality of filtering policies.

In Example 26, the subject matter of Example 25 includes subject matter where the plurality of filtering policies include: an allowed list of system calls, the system calls in the allowed list associated with an allowed system call category; a blocked list of system calls, the system calls in the blocked list associated with a blocked system call category; a fatally blocked list of system calls, the system calls in the fatally blocked list associated with a fatally blocked system call category; and a conditionally allowed list of system calls, the system calls in the conditionally allowed list associated with a conditionally allowed system call category.

In Example 27, the subject matter of Example 26 includes subject matter where the operations for the determining whether performing the system call is permitted when the at least one operation is within the blocked list of system calls or the fatally blocked list of system calls, further comprise: performing a trace on the system call; verifying the at least one operation is within the blocked list of system calls or the fatally blocked list of system calls based on the trace; communicating a blocking instruction for the system call to the OS manager based on the verifying; blocking execution of the system call based on the blocking instruction; and storing a log entry of blocking the execution of the system call in a log.

In Example 28, the subject matter of Examples 26-27 includes subject matter where the operations for the determining whether performing the system call is permitted when the at least one operation is within the conditionally allowed list of system calls, further comprise: verifying one or more arguments of the system call are permitted based on the plurality of filtering policies; communicating a blocking instruction for the system call to the OS manager when the one or more arguments of the system call are not permitted; and communicating a resume instruction for resuming execution of the system call to the OS manager, when the one or more arguments of the system call are permitted.

In Example 29, the subject matter of Example 28 includes subject matter where the operations for the determining whether performing the system call is permitted when the at least one operation is within the conditionally allowed list of system calls, further comprise: verifying a number of times the system call has been previously executed is below a threshold number; communicating a blocking instruction for the system call to the OS manager, when the number of times the system call has been previously executed is above the threshold number; and communicating a resume instruction for resuming execution of the system call to the OS manager, when the number of times the system call has been previously executed is equal to or below the threshold number.

In Example 30, the subject matter of Examples 25-29 includes subject matter where the operations further comprise: generating a report based on the determining.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Conclusion

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
instantiating, by at least one hardware processor of a computing node, a user-defined function (UDF) server associated with a plurality of configurations; instantiating, using the plurality of configurations, a plurality of child processes of the UDF server;
configuring using a child process of the plurality of child processes, a filtering process at an operating system (OS) kernel of the computing node, the filtering process comprising a set of system call categories and a corresponding set of filtering policies;
detecting a system call received at the OS kernel is associated with a system call category of the set of system call categories and violates a corresponding filtering policy of the set of filtering policies; and
initiating a tracing event of the system call based on the detecting.

2. The method of claim 1, further comprising:
detecting a UDF received at the computing node, the UDF comprising code related to at least one operation.

3. The method of claim 2, further comprising:
instantiating, as the child process of the plurality of child processes of the UDF server, a user code runtime.

4. The method of claim 3, further comprising:
executing, using the user code runtime, the code of the UDF to perform the at least one operation, the executing causing the system call.

5. The method of claim 3, further comprising:
instantiating a sandbox process as another child process of the plurality of child processes; and
instantiating the user code runtime as a child process of the sandbox process.

6. The method of claim 1, further comprising:
configuring the set of system call categories to include a blocked system call category, a fatally blocked system call category, and a conditionally allowed system call category.

7. The method of claim 6, further comprising:
configuring the corresponding set of filtering policies to include:
 a blocked list of system calls, the system calls in the blocked list associated with the blocked system call category;
 a fatally blocked list of system calls, the system calls in the fatally blocked list associated with the fatally blocked system call category; and
 a conditionally allowed list of system calls, the system calls in the conditionally allowed list associated with the conditionally allowed system call category.

8. The method of claim 7, further comprising:
generating a notification identifying the system call, the notification based on a determination the system call is within one of the blocked list of system calls, the fatally blocked list of system calls, or the conditionally allowed list of system calls; and
blocking the system call based on the notification.

9. The method of claim 7, further comprising:
generating a notification identifying the system call, the notification based on a determination the system call is within the conditionally allowed list of system calls; and allowing execution of the system call based on the notification.

10. The method of claim 7, further comprising:
determining whether performing the system call is permitted when the system call is within the conditionally allowed list of system calls based on verifying one or more arguments of the system call are permitted using the corresponding set of filtering policies;
communicating a blocking instruction for the system call to the OS kernel, when the one or more arguments of the system call are not permitted; and
communicating a resume instruction for resuming execution of the system call to the OS kernel, when the one or more arguments of the system call are permitted.

11. A system comprising:
at least one hardware processor of a computing node; and
at least one memory storing instructions that cause the at least one hardware processor to perform operations comprising:
instantiating a user-defined function (UDF) server associated with a plurality of configurations;
instantiating, using the plurality of configurations, a plurality of child processes of the UDF server;
configuring using a child process of the plurality of child processes, a filtering process at an operating system (OS) kernel of the computing node, the filtering process comprising a set of system call categories and a corresponding set of filtering policies;
detecting a system call received at the OS kernel is associated with a system call category of the set of system call categories and violates a corresponding filtering policy of the set of filtering policies; and
initiating a tracing event of the system call based on the detecting.

12. The system of claim 11, the operations further comprising:
detecting a UDF received at the computing node, the UDF comprising code related to at least one operation.

13. The system of claim 12, the operations further comprising:
instantiating, as the child process of the plurality of child processes of the UDF server, a user code runtime.

14. The system of claim 13, the operations further comprising:
executing, using the user code runtime, the code of the UDF to perform the at least one operation, the executing causing the system call.

15. The system of claim 13, the operations further comprising:
instantiating a sandbox process as another child process of the plurality of child processes; and
instantiating the user code runtime as a child process of the sandbox process.

16. The system of claim 11, the operations further comprising:
configuring the set of system call categories to include a blocked system call category, a fatally blocked system call category, and a conditionally allowed system call category.

17. The system of claim 16, the operations further comprising:
configuring the corresponding set of filtering policies to include:
 a blocked list of system calls, the system calls in the blocked list associated with the blocked system call category;
 a fatally blocked list of system calls, the system calls in the fatally blocked list associated with the fatally blocked system call category; and
 a conditionally allowed list of system calls, the system calls in the conditionally allowed list associated with the conditionally allowed system call category.

18. The system of claim 17, the operations further comprising:
- generating a notification identifying the system call, the notification based on a determination the system call is within one of the blocked list of system calls, the fatally blocked list of system calls, or the conditionally allowed list of system calls; and
- blocking the system call based on the notification.

19. The system of claim 17, the operations further comprising:
- generating a notification identifying the system call, the notification based on a determination the system call is within the conditionally allowed list of system calls; and
- allowing execution of the system call based on the notification.

20. The system of claim 17, the operations further comprising:
- determining whether performing the system call is permitted when the system call is within the conditionally allowed list of system calls based on verifying one or more arguments of the system call are permitted using the corresponding set of filtering policies;
- communicating a blocking instruction for the system call to the OS kernel, when the one or more arguments of the system call are not permitted; and
- communicating a resume instruction for resuming execution of the system call to the OS kernel, when the one or more arguments of the system call are permitted.

21. A computer-storage medium comprising instructions that, when executed by one or more processors of a machine, configure the machine to perform operations comprising:
- instantiating at a computing node, a user-defined function (UDF) server associated with a plurality of configurations;
- instantiating, using the plurality of configurations, a plurality of child processes of the UDF server;
- configuring using a child process of the plurality of child processes, a filtering process at an operating system (OS) kernel of the computing node, the filtering process comprising a set of system call categories and a corresponding set of filtering policies;
- detecting a system call received at the OS kernel is associated with a system call category of the set of system call categories and violates a corresponding filtering policy of the set of filtering policies; and
- initiating a tracing event of the system call based on the detecting.

22. The computer-storage medium of claim 21, the operations further comprising:
- detecting a UDF received at the computing node, the UDF comprising code related to at least one operation.

23. The computer-storage medium of claim 22, the operations further comprising:
- instantiating, as the child process of the plurality of child processes of the UDF server, a user code runtime.

24. The computer-storage medium of claim 23, the operations further comprising:
- executing, using the user code runtime, the code of the UDF to perform the at least one operation, the executing causing the system call.

25. The computer-storage medium of claim 23, the operations further comprising:
- instantiating a sandbox process as another child process of the plurality of child processes; and
- instantiating the user code runtime as a child process of the sandbox process.

26. The computer-storage medium of claim 21, the operations further comprising:
- configuring the set of system call categories to include a blocked system call category, a fatally blocked system call category, and a conditionally allowed system call category.

27. The computer-storage medium of claim 26, the operations further comprising:
- configuring the corresponding set of filtering policies to include: a blocked list of system calls, the system calls in the blocked list associated with the blocked system call category;
- a fatally blocked list of system calls, the system calls in the fatally blocked list associated with the fatally blocked system call category; and
- a conditionally allowed list of system calls, the system calls in the conditionally allowed list associated with the conditionally allowed system call category.

28. The computer-storage medium of claim 27, the operations further comprising:
- generating a notification identifying the system call, the notification based on a determination the system call is within one of the blocked list of system calls, the fatally blocked list of system calls, or the conditionally allowed list of system calls; and
- blocking the system call based on the notification.

29. The computer-storage medium of claim 27, the operations further comprising:
- generating a notification identifying the system call, the notification based on a determination the system call is within the conditionally allowed list of system calls; and
- allowing execution of the system call based on the notification.

30. The computer-storage medium of claim 27, the operations further comprising:
- determining whether performing the system call is permitted when the system call is within the conditionally allowed list of system calls based on verifying one or more arguments of the system call are permitted using the corresponding set of filtering policies;
- communicating a blocking instruction for the system call to the OS kernel, when the one or more arguments of the system call are not permitted; and
- communicating a resume instruction for resuming execution of the system call to the OS kernel, when the one or more arguments of the system call are permitted.

* * * * *